United States Patent [19]

Yasumatsu et al.

[11] 4,387,790
[45] Jun. 14, 1983

[54] WEBBING LOCKING DEVICE

[75] Inventors: Jun Yasumatsu, Toyota; Hiroshi Tsuge, Chiryu; Takashi Kawaharazaki, Toyoake, all of Japan

[73] Assignees: Toyota Jidosha Kogyo Kabushiki Kaisha; Kabushiki Kaisha Tokai-Rika-Denki-Seisakusho, both of Aichi, Japan

[21] Appl. No.: 243,695

[22] Filed: Mar. 16, 1981

[30] Foreign Application Priority Data

Mar. 21, 1980 [JP] Japan .............................. 55-37613[U]
Mar. 21, 1980 [JP] Japan .............................. 55-37614[U]

[51] Int. Cl.³ .............................................. A62B 35/00
[52] U.S. Cl. .................. 188/65.3; 242/107.2
[58] Field of Search .................... 242/107–107.7; 280/803, 806–808; 297/476, 478–480; 308/159, 26, 135; 188/65.1–65.4

[56] References Cited

U.S. PATENT DOCUMENTS

| | | | |
|---|---|---|---|
| 2,296,798 | 9/1942 | Reid | 308/159 |
| 2,970,017 | 1/1961 | Zaslawsky | 308/159 |
| 3,050,350 | 8/1962 | Loretan | 308/159 |
| 3,942,848 | 3/1976 | Voumard | 308/159 |
| 4,136,841 | 1/1979 | Fohl | 242/107 |
| 4,223,853 | 9/1980 | Ernst | 242/107.4 R |
| 4,286,759 | 9/1981 | Usami et al. | 242/107.2 |

Primary Examiner—John M. Jillions
Attorney, Agent, or Firm—Parkhurst & Oliff

[57] ABSTRACT

A webbing locking device for clamping the intermediate portion of an occupant restraining portion by means of a pair of friction members provided on a frame and a lock lever, respectively, in an emergency of a vehicle, including a roller, around which the intermediate portion of the webbing is guided. This roller smoothly guides the webbing by use of holding means during normal running condition of a vehicle, however, in an emergency of the vehicle, moves in the radial direction thereof to come into contact with frictional contact means to thereby be subjected to a friction resistance, whereby a tension in the webbing in the clamped portion is reduced, so that the webbing in the clamped portion can avoid breakage.

7 Claims, 12 Drawing Figures

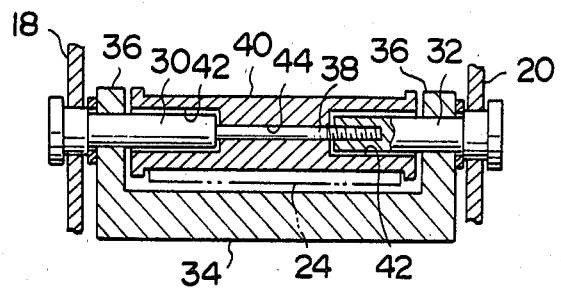
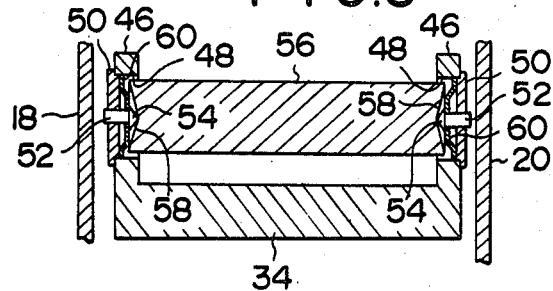
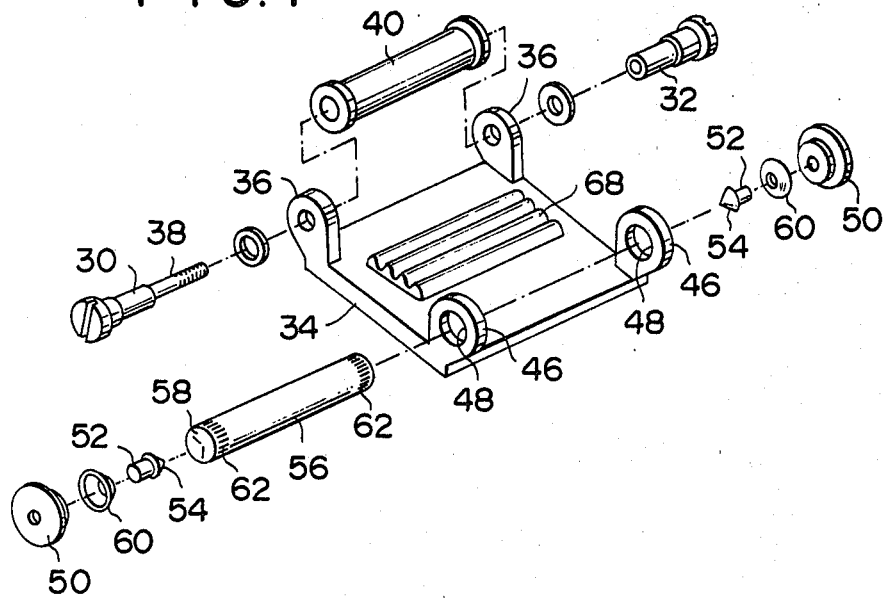

WEBBING LOCKING DEVICE

BACKGROUND OF THE INVENTION

1. Field of the Invention

This invention relates to webbing locking devices for use in seatbelt systems for locking an occupant restraining webbing, and particularly to a webbing locking device wherein consideration is given to direct locking of the intermediate portion of the webbing.

2. Description of the Prior Art

There has been proposed a webbing locking deivce wherein, in the case where the tension of an occupant restraining webbing is increased in an emergency such as a collision, this webbing tension is utilized to directly lock the intermediate portion of the webbing, whereby a condition of loosely wound-out webbing is prevented from occurring, so that the occupant can be positively restrained. In the webbing locking device of the type described, the webbing is guided around the forward end of a lock lever pivotally supported on a frame. Tension in the webbing in an emergency is imparted as a pivotal movement of the lock lever, so that this pivotal movement can be utilized to directly lock the intermediate portion of the webbing by means of a pair of friction members. A roller is provided at a webbing contact portion of this lock lever, around which the webbing is guided, to decrease a resistance applied to the movement of the webbing. However, the friction resistance generated at the roller portion is comparatively high, and hence, the resistance against the movement of the webbing in normal use has not yet been sufficiently reduced, thus causing an unsatisfactory winding of the webbing to a takeup shaft and resulting in a high resisting force felt by the occupant when the webbing is wound out.

Furthermore, in the case the roller is used at the webbing contact portion, there is no large variations in tension at the portions before and after the webbing contact portion of the roller and the variations are substantially identical with each other, the tension of the webbing clamped by the pair of the friction members becomes high, so that the webbing cannot be perfectly locked between the friction members in an emergency.

SUMMARY OF THE INVENTION

The present invention has been developed in view of the abovedescribed disadvantages and has as its object the provision of a webbing locking device wherein the resistance applied to the webbing is very low in normal use, and a resistance is applied to the movement of the webbing in an emergency, whereby the tension of the portion of the webbing clamped by the pair of friction members is reduced, so that a perfect locking of the webbing can be effected.

In the webbing locking device according to the present invention, a roller, around the outer periphery of which the intermediate portion of a webbing is guided, is brought into a condition of smoothly guiding the webbing during normal running condition of the vehicle by holding means, and, in an emergency of the vehicle, the roller is moved in the radial direction thereof to be brought into contact with frictional contact means, whereby a friction resistance is generated, so that clamped portion of the webbing can be prevented from being broken by clamping means.

Description will hereunder be given of embodiments of the present invention with reference to the drawings.

BRIEF DESCRIPTION OF THE DRAWINGS

FIG. 2 is a sectional view taken along the line II—II in FIG. 1;

FIG. 3 is a sectional view taken along the line III—III in FIG. 1;

FIG. 4 is a disassembled perspective view showing the lock lever and the accessories thereof.

DESCRIPTION OF THE PREFERRED EMBODIMENTS

Figure 1:
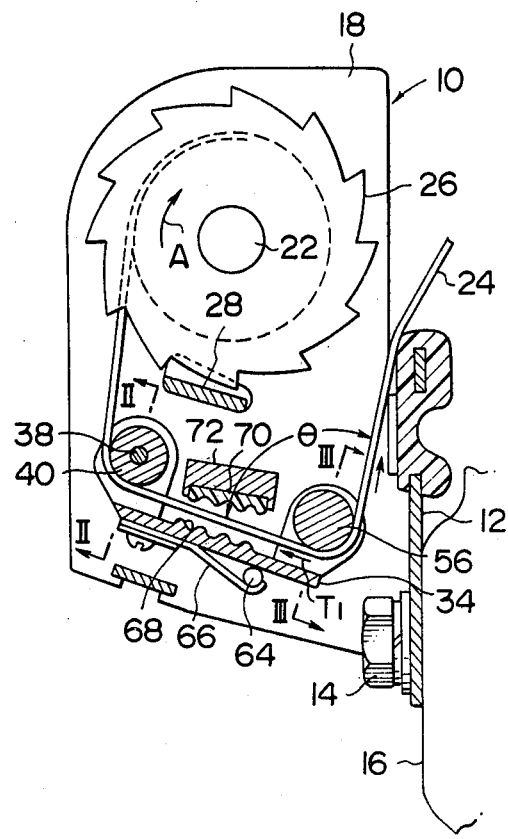
FIG. 1 is a sectional view showing a first embodiment of the webbing locking device according to the present invention, with one of the legs not shown.

FIGS. 1 through 4 show the first embodiment of the present invention, in which the webbing locking device is assembled into a webbing retractor 10. This webbing retractor 10 is provided with a frame 12, which is solidly secured to a vehicle 16 through a mounting bolt 14.

A takeup shaft 22 is rotatably supported across a pair of legs 18 and 20 (in FIG. 1, one of the legs 20 is not shown) extended from opposite ends of the frame 12 in parallel with each other, and winds up one end portion of an occupant restraining webbing 24 in layers. This takeup shaft 22 is biased in the windup direction of the webbing 24 (a direction indicated by an arrow A in FIG. 1) by a biasing force of a spiral spring, not shown. The other portion, not shown, of the webbing 24 is withdrawn to the outside of the retractor 10 and reaches an occupant restraining portion.

Solidly secured to the takeup shaft 22 are ratchet wheels 26, which are opposed to a pawl 28 tiltably supported across the parallel legs 18, 20. This pawl 28 is adapted to be operated by an acceleration sensor, not shown, which is constituted by a pendulum or the like, to be brought into meshing engagement with the ratchet wheels 26, thereby enabling the windout rotations of the ratchet wheels 26 and the takeup shaft 22 to stop.

A lock lever 34 is rotatably supported at the lower portions of the parallel legs 18, 20 by support shafts 30, 32. The support shafts 30, 32 penetrate the parallel legs 18, 20 from outside, respectively, and further penetrate bearing projections 36 of the lock lever 34, respectively. Furthermore, a small diameter shaft portion 38 is projected from the forward end of the support shaft 30 and the forward portion thereof is threadably coupled to the support shaft 32, whereby the support shafts 30 and 32 have one and the same center axis.

These support shafts 30, 32 rotatably support a roller 40 between the bearing projections 36 of the lock lever 34. This roller 40 is penetratingly provided at axially opposite end portions thereof with large diameter holes 42 each having a slight clearance between the outer periphery of the support shafts 30, 32 and itself. Furthermore, this roller 40 is penetratingly provided at the axially intermediate portion thereof with a small diameter hole 44, through which the roller 40 is rotatably supported on the small diameter shaft portion 38. Consequently, when the webbing 24 is guided around the outer periphery of the roller 40, due to the ratio in diameter between the roller 40 and the small diameter hole 44, a friction resistance applied to rotation of the roller 40 is decreased to a considerable extent, so that the webbing 24 can be smoothly moved. However, in the case that deflection of the small diameter shaft portion 38 is increased, the inner surfaces of the large diameter holes 42 come into contact with the outer peripheries of the support shafts 30, 32, so that a high external force can be supported.

A pair of second bearing projections 46 are projected from portions adjacent the forward ends of the lock lever 34, bushes 50 each having a collar are coupled into round holes 48 penetratingly provided in these second bearing projections 46, and support shafts 52 are extended through core portions of these bushes 50 each having the collar. Conical head portions 54 each having a vertical angle of about 120° are solidly secured to the forward ends of these support shafts 52, respectively.

The forward ends of these conical head portions 54 are in opposed relation with each other and clamp the core portion of a webbing contact roller 56. This roller 56 is carvingly provided at axially opposite end portions thereof with cone receiving surfaces 58 each having a larger angle than the vertical angle of the conical head portion 54, the forward ends of the conical head portion 54 are brought into contact with the vertexes of the cone receiving surfaces 58 to thereby rotatably support the roller 56. Here, the outer diameter of the roller 56 is made slightly smaller than the inner diameter of the round hole 48 of the second bearing projection 46, whereby the outer peripheries of the roller 56 are separated from the round holes 48 during normal running condition of the vehicle, so that no friction resistances are given to the outer peripheries of the roller 56.

Belleville springs 60 are inserted in the aforesaid round holes 48, respectively. The support shafts 52 are extended through core holes of the belleville springs 60, respectively, and the belleville springs 60 bias the bottom surfaces of the conical head portions 54, whereby the conical head portions 54 are brought into pressing contact with the cone receiving surfaces 58, respectively. Consequently, the vertexes of the conical head portions 54 are each disposed at one side of an inclined surface formed at an end face of the roller 56, i.e., on the axial line of the roller 56. When the roller 56 receives a force in the radial direction thereof, the belleville springs are deflected to move the roller 56 in the radial direction thereof, whereby the cone receiving surfaces 58 slide on the conical head portions 54, so that the outer peripheries of the roller 56 come into contact with the round holes 48. Knurled portions are provided on the outer peripheries of the axially opposite end portions of the roller 56 to increase friction resistances when the roller 56 comes in contact with the round holes 48.

A leaf spring 66 is confined between the aforesaid lock lever 34 and a stopper 64 racked across the parallel legs 18, 20 and the lock lever 34 is biased in a direction of approaching the stopper 64 (the clockwise direction in FIG. 1) by a biasing force of the leaf spring 66.

Moreover, wave-shaped ridges serving as friction members are formed at the intermediate portion of the lock lever 34. These wave-shaped ridges 68 are adapted to approach a friction member 70 made of a synthetic resin material, which is racked across the parallel legs 18, 20, when the lock lever 34 is turned against a biasing force of the leaf spring 66, whereby the wave-shaped ridges 68 and the friction member 70 constitute a lock member for clamping the intermediate portion of the webbing 24. The surface of the friction member 70 is complementary to the wave-shaped ridges 68, and the friction member 70 is secured to a reinforcing member 72 racked across the parallel legs 18 and 20.

In the first embodiment of the present invention with the arrangement as described above, one end, not shown, of the webbing 24 is wound out of the takeup shaft 22, guided around the rollers 40 and 56, and then, reaches an occupant fastened portion, where it is fastened to the occupant.

Here, during normal running condition of the vehicle, the occupant can wind out a necessary amount of the webbing from the takeup shaft 22, to thereby change his driving posture. In this case, the rollers 40 and 56 are supported by the small diameter shaft portion 38 and the axial portion of the roller 56, respectively, so that the rollers 40 and 56 can rotate at very small resistances determined by ratios between the outer diameters of the roller 40 and the small diameter shaft portion 38 and between the outer diameter of the roller 56 and the distance from the vertex of the conical head portion 54 and the axis of the roller 56, thereby enabling to making the movement of the webbing very smooth at the times of fastening the webbing to the occupant, changing the driving posture in webbing fastened condition and winding up the webbing after the webbing is unfastened.

Next, in a vehicular emergency such as a collision, the pawl 28 is brought into meshing engagement with the ratchet wheels 26 through the action of the acceleration sensor, not shown, so that the webbing without rotation of the takeup shaft 22 can be abruptly stopped. Meanwhile, tension in the webbing 24 is increased due to an inertial force of a collision of the occupant. This increased tension is imparted to the lock lever 34 through the roller 56, whereby the lock lever 34 is turned about the small diameter shaft portion 38 in the counterclockwise direction in FIG. 1. This rotation causes the wave-shaped ridges 68 of the lock lever 34 to approach the friction member 70 to thereby clamp the intermediate portion of the webbing 24 therebetween.

Since the intermediate portion of the webbing 24 is directly locked as described above, no high tension acts on the portion of the webbing 24 between the locked portion and the takeup shaft 22, and consequently, no disadvantage occurs of this portion of the webbing being loosely wound out of the takeup shaft 22 to make the occupant restrained condition unreliable, so that the occupant can be secured in a sufficiently restrained condition.

Furthermore, in this case, since a force acts on the roller 56 in the radial direction thereof due to the increased tension in the webbing 24, the cone receiving surfaces 58 of the roller 56 slide on the conical head portions 54 and move in the radial direction of the roller 56 while deflecting the belleville springs 60, whereby the outer peripheral portions of the roller 56 come into contact with the round holes 48 of the second bearing projections 46. This hinders the rotation of the roller 56, whereby a high tension acting on a portion of the webbing 24 between the roller 56 and an occupant restraining portion, not shown, is reduced in this portion of the roller 56, so that only a considerably decreased tension acts on a portion of the webbing 24 between the rollers 40 and 56. Consequently, a force for withdrawing the webbing 24 clamped by the lock member from this clamped portion is reduced to a considerable extent, so that the intermediate portion of the webbing 24 can be reliably locked between the wave-shaped ridges 68 and the friction member 70.

Additionally, a reaction force received by the lock lever 34 at this time of locking is imparted to the small diameter shaft portion 38 through the roller 40, and, in the case this small diameter shaft portion 38 is deflected, the large diameter holes 42 of the roller 40 come into contact with the support shafts 30 and 32. As a result, the reaction force received by the lock lever 34 is reliably supported by the frame 12, so that the parts concerned therewith can avoid being damaged.

Figure 5:
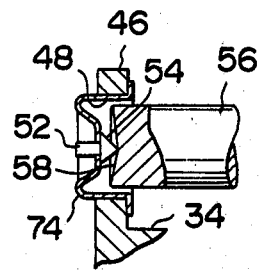

Next, FIG. 5 shows a second embodiment of the present invention, in which the bushes 50 each having the collar in the preceding embodiment are replaced with resilient bearings 74. This resilient bearing 74 is constructed such that a resilient thin sheet material is bent to provide a cylinder, which is inserted through the round hole 48. Inserted into a core portion of this cylinder is the support shaft 52 having the conical head portion 54 in the same manner as in the preceding embodiment, and the forward end of this conical head portion 54 is brought into abutting contact with the cone receiving surface 58 of the roller 56 in the same manner as in the preceding embodiment.

In this embodiment also, the conical head portion 54 is in pressing contact with the cone receiving surface 58 due to the resilient forces of the bearings 74, whereby the outer peripheral surface of the roller 56 comes into contact with the inner peripheral surfaces of the resilient bearings 74 to be subjected to a friction resistance due to the rotation, so that the same effect in the same manner as in the preceding embodiment can be achieved. In this embodiment, the number of parts is reduced as compared with that of the preceding embodiment.

Figure 6:
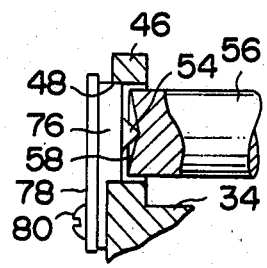

Next, FIG. 6 shows a third embodiment of the present invention, in which support plates 76 and holders are provided as means for rotatably supporting the roller 56. The conical head portions 54 projected form a portion of each support plate 76 is in contact with the cone receiving surface 58 of the roller 56 in the same manner as in the preceding embodiments, and this support plate 76 together with the holers 78 are mounted on the lock lever 34 through a mounting screw 80. Here, the holders 78 are made of a synthetic resin material, by an elastic force of which the support plates 76 are biased to approach the roller 56. Furthermore, the support plates 76 are each provided with a portion having dimensions to be inserted into the round hole 48 of the second bearing projection 46, thus enabling to simplify the shapes of the parts as compared with the preceding embodiments.

Figure 7:
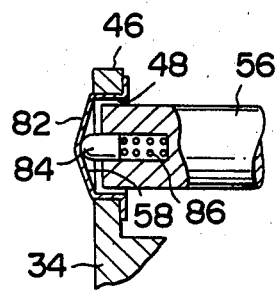

Next, FIG. 7 shows a fourth embodiment of the present invention. In this embodiment, thin sheet bearings 82 coupled into the round holes 48 of the second bearing projections 46 are each provided thereon with the cone receiving surface 58. More specifically, the bearing 82 is constructed such that a thin sheet is bent to provide a bottomed cylinder, and support shafts 84 provided at the axial portions of the roller 56 are brought into abutting contact with conical axial portions of the cone receiving surfaces 58.

These support shafts 84 are inserted into cylindrical holes penetratingly provided at axially opposite ends and are biased to be projected from the roller 56 by biasing forces of compression coil springs 86 confined between the bottoms of the cylindrical holes and themselves.

Consequently, in this embodiment also, the support shafts 84 are in contact with the bottom surfaces of the cone receiving surfaces 58 of the thin sheet bearings 82 during normal running condition of the vehicle, however, when subjected to an external force in the radial direction thereof, the support shafts 84 slidably move along the cone receiving surfaces 58, whereby the outer peripheral surfaces of the roller 56 come into contact with the inner peripheral surfaces of the bearing 82 to be subjected to friction resistances.

Additionally, in this embodiment, semispherical surfaces formed on the forward end portions of the support shafts 84 to be brought into contact with the bearings 82 can be formed to provide conical surfaces in the same manner as in the preceding embodiments, or the support shaft 84 may be replaced with steel balls.

Figure 8:
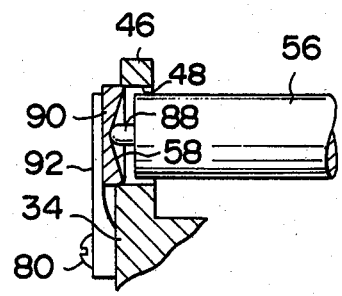

Next, FIG. 8 shows a fifth embodiment of the present invention. In this embodiment, solidly secured to the axes of the roller 56 are support shafts 88 similar to the support shafts 84 in the preceding embodiment. The forward ends of these support shafts 88 are in abutting contact with bearing plates 90 axially movably inserted into the round holes 48 of the second bearing projections 46, and the abutting contact surfaces of the bearing plate 90 are formed into the cone receiving surfaces 58 in the same manner as in the preceding embodiments.

Furthermore, these bearing plates 90 are constantly biased in the directions of the roller 56 by elastic forces of holders 92 made of synthetic resin material solidly secured to the lock lever 34 through the mounting screw 80. Consequently, in this embodiment also, the support shafts 88 of the roller 56 are in abutting contact with the conical vertexes of the cone receiving surfaces 58 during normal running condition of the vehicle, however, when subjected to an external force in the radial direction thereof, the support shafts 88 of the roller 56 slidably move along the cone receiving surfaces 58 of the bearing plates 90 while deflecting the holders 92, whereby the outer peripheral surfaces of the roller 56 come into contact with the inner peripheral surfaces of the round holes 48 to be subjected to turning resistances.

Figure 9:
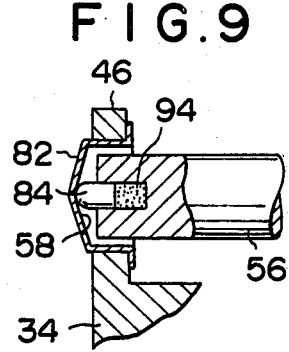

Next, FIG. 9 shows a sixth embodiment of the present invention. This embodiment is identical in arrangement with the fourth embodiment shown in FIG. 7, however, the compression coil springs 86 in the fourth embodiment are replaced with filling materials 94 made of an elastomeric material such as rubber. The filling materials 94 bias the support shafts 84 to be projected from the roller 56, whereby the support shafts 84 are in contact with the conical vertexes of the bearings 82, and, when the tension of the webbing is increased, the support shafts 84 are pressed into the roller 56, thereby enabling to achieve the same effect as obtained in the preceding embodiments.

Figure 10:
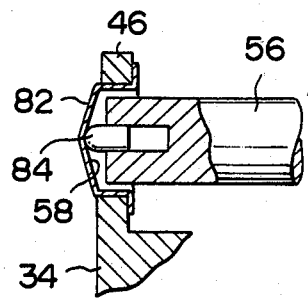

Next, FIG. 10 shows a seventh embodiment, which is substantially identical in arrangement with the sixth embodiment, however, no filling materials are used, and, instead, the support shafts 84 are pressed into cylindrical holes formed in the roller 56, with clearances being formed between the end faces of the support shafts 84 and the bottom faces of the cylindrical holes.

Consquently, in this embodiment, when the roller 56 is subjected to an external force in the radial direction thereof, the support shafts 84 are pressed into the roller 56, so that the vertexes of the support shafts 84 can slide on the cone receiving surfaces 58. Because of this, in this embodiment, it is impossible to reuse the roller 56, differing from the preceding embodiment.

Additionally, in the preceding embodiments, there have been disclosed such embodiments that the rotatably supporting surfaces for the roller are conical surfaces. However, it must be understood that the concept of the invention is not limited to these types shown in the preceding embodiment, all such variations and modifications fall within the technical scope of the invention as are arranged such that the roller is rotatably supported through surfaces inclined to the axial line of the roller, the roller supporting portions are each disposed at one side of the inclined surface adjacent the axial line of the roller during normal running condition of the vehicle, and the roller supporting portions are each made movable toward the other side of the inclined surface when the tension in the webbing is increased.

Figure 11:
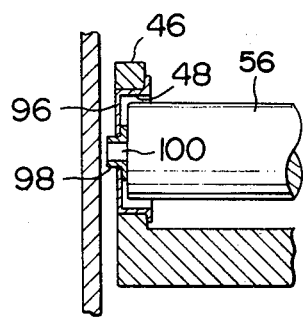
FIGS. 5 through 12 are sectional views showing the enlarged essential portions of a second through ninth embodiments of the present invention, respectively.

Next, FIG. 11 shows an eighth embodiment of the present invention, in which holders 96 are inserted into the round holes 48. These holder 96 are constructed such that thin wall sheet materials are bent to provide cylinders, into which bushes 98 are inserted, respectively, and small diameter shaft portions 100 formed on opposite ends of the roller 56 are rotatably supported through the bushes 98.

Consequently, when the roller 56 is subjected to a high load in the radial direction thereof, the small diameter shaft portions 100 are plastically deformed to move in the radial direction of the roller 56, whereby the outer peripheral surfaces of the roller 56 come into contact with the holders 96 to be subjected to turning resistances, respectively.

Figure 12:
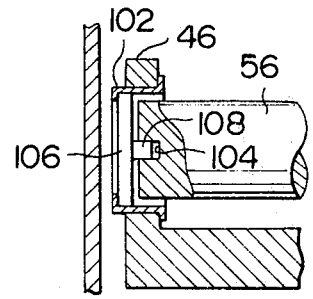

Next, FIG. 12 shows a ninth embodiment of the present invention. The roller 56 used in this embodiment is spaced apart a predetermined distance from each of the inner peripheral surfaces of the opposite holders 102 in the same manner as in the preceding embodiment. However, this embodiment is different from the preceding embodiment in the construction in which the roller 56 is supported by the holders 102.

More specifically, in this embodiment, round holes 104 each having a predetermined depth are penetratingly provided at axially opposite end portions of the roller 56, and inserted into these round holes 104 are small diameter shaft portions 108 projected from the axes of the bushes 106 fixed on the holders 102, to thereby rotatably support the roller 56. These bushes 106 are preferably made of synthetic resin material, and, when the roller 56 is subjected to a high load in the radial direction thereof, the small diameter shaft portions 108 are broken, so that the roller 56 can be moved in the radial direction thereof.

Consequently, in this embodiment also, the roller 56 moves smoothly the webbing 24, which is guided therearound, during normal running condition of the vehicle. While, the tension in the webbing is reduced by the friction resistance of the roller 56 in an emergency of the vehicle.

In addition, in the abovedescribed embodiments, description has been given of the embodiments in which the small diameter shaft portion 100 and 108 are plastically deformed. However, it must be understood that the concept of the invention is not limited to these types, all such variations and modifications fall within the technical scope of the invention as are arranged such that the roller is subjected to a friction resistance due to deformation of the plastically deforming portion provided between the roller and the lock lever.

What is claimed is:

1. A webbing locking device used in a seatbelt system for clamping an intermediate portion of an occupant restraining webbing in a vehicular emergency, comprising:
    a frame secured to a vehicle body;
    a lock lever pivotally supported on said frame by a support shaft;
    lock means for clampingly locking the intermediate portion of the webbing when said lock lever pivots during a vehicular emergency;
    a first roller rotatably supported on said lock lever, and placed in a position remote from said support shaft, around which the intermediate portion of the webbing is guided, so that said lock lever is pivoted by said first roller when the tension in the webbing increases;
    supporting means between said lock lever and axially opposite ends of said first roller for rotatably supporting said first roller on said lock lever and enabling said first roller to move in a radial direction with respect to said first roller;
    contact means for contacting the outer periphery of said first roller only when said first roller moves in said radial direction, to give a frictional resistance to the rotation of said first roller; and
    the supporting means comprising a first portion secured to the lock lever, a separate second portion secured to the first roller, and resilient biasing means, the first and second portions normally being resiliently urged by the biasing means toward each other into contact so as to maintain the periphery of the roller away from the contacting means, whereupon when the tension in the webbing exceeds a predetermined value the first and second portions are caused to move relative to each other in a direction that brings the periphery of the first roller toward the contacting means, and the first and second portions are caused to move further apart in opposition to the resilient biasing means;
    whereby, in the vehicular emergency, the tension in a portion of the webbing clamped by said lock means is reduced by said frictional resistance to rotation of said first roller.

2. A webbing locking device as set forth in claim 1, further comprising a second roller rotatably supported around said support shaft on said frame, around which the intermediate portion of the webbing is guided, said second roller being disposed in parallel with said first roller.

3. A webbing locking device as set forth in claim 1, wherein:
    said second portion comprises a conical pit formed at axially opposite ends of said first roller; and
    said first portion comprises a support member resiliently supported by said biasing means on said lock lever and having a conical head being biased toward the vertexes of said conical pit.

4. A webbing locking device as set forth in claim 1, wherein:
    said second portion comprises an axial shaft resiliently projecting from the axially opposite ends of said first roller and having a semispherical head; and
    said first portion comprises a supporting member on said lock lever having a conically intruded receiving surface receiving said semispherical head of said axial shaft.

5. A webbing locking device as set forth in claim 4, wherein said biasing means comprises a resilient member interposed between said first roller and said axial shaft.

6. A webbing locking device as set forth in claim 4, wherein said biasing means comprises an elastometric material interposed between said first roller and said axial shaft.

7. A webbing locking device as set forth in claim 4, wherein said axial shaft is pressed into a cylindrical hole formed at the axially opposite ends of said first roller, and said axial shaft is further pressed into said hole when subjected to an external force exceeding a predetermined value.

* * * * *